July 7, 1931.  M. L. WEBSTER  1,813,786
INSULATED CASE
Filed Aug. 5, 1929

INVENTOR
Melvin L. Webster.
BY *G.C. Kennedy*
ATTORNEY

Patented July 7, 1931

1,813,786

UNITED STATES PATENT OFFICE

MELVIN L. WEBSTER, OF INDEPENDENCE, IOWA

INSULATED CASE

Application filed August 5, 1929. Serial No. 383,505.

My invention relates to improvements in shipping and storing cases, and the object of my improvement is to furnish for a container a sectional casing having means therein for supporting the container therein removably or permanently and spaced throughout therefrom except at minimum areas of contact, to thus give a dead air space around the container to serve as a means of heat insulation therefor, appropriate for use by shippers, merchants or others.

Figure 1:
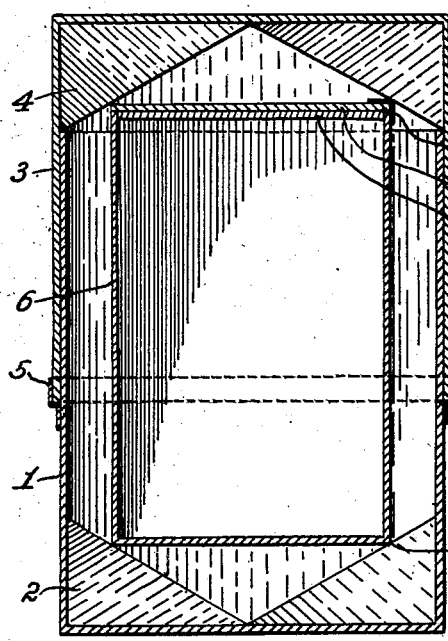
Figure 4:
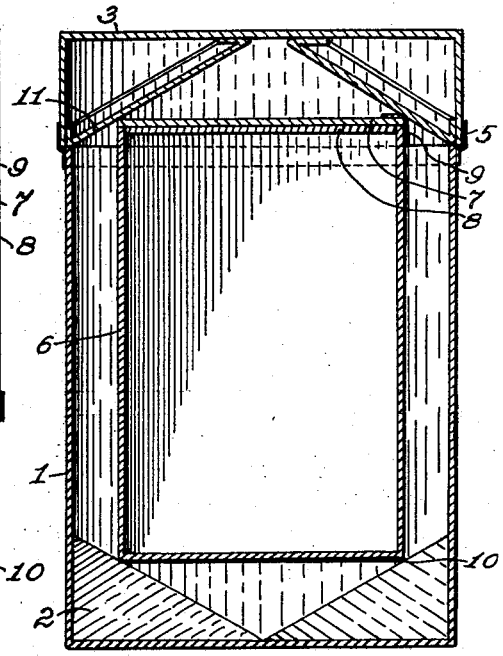
Figure 2:
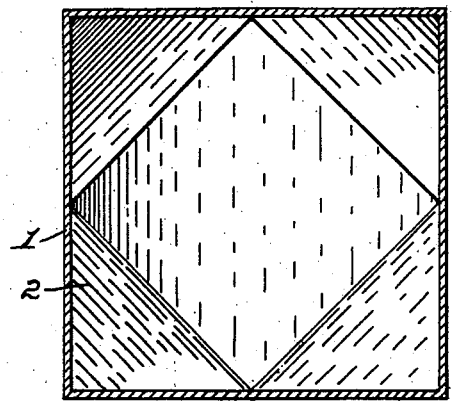
Figure 3:
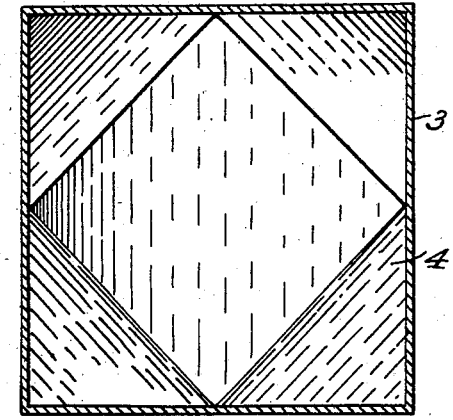

I have accomplished this object by the means which are hereinafter described and claimed, and which are illustrated in the accompanying drawings, in which Fig. 1 is a medial vertical cross section of the inner container and the outer telescoping and assembled outer casing members. Fig. 2 is a horizontal section of the inner or telescoped cupped casing member taken just above its inner corner spacers, and Fig. 3 is a similar view of the outer or telescoping cupped casing member, taken just below its corner spacers. Fig. 4 shows a modification of Fig. 1.

Various modifications of the above elements in combination may be made within the scope of the claims without departing from my invention.

It is my purpose to supply devices of this class which will be light, well reinforced to stand stresses of shipping or otherwise, and inexpensive. They may be supplied in small or larger units as desired, and constructed of any suitable materials according to the requirements of their use.

The exemplification of the invention in Figs. 1 to 3 of said drawings shows an inner container 6, which may be made of fiber board, closed at one end and open at the other, and supplied with a closure 7 for its open end swinging on a flexible hinge member 9. An inner end board or liner 8 may be inserted in this container to aid in sealing or closing the same above its contents.

The outer insulating casing is in two parts or sections, cupped and rectangular in shape, the top or closure member 3 telescoping over the open end of the lower and inner casing member 1. These members may also be of fiber board, or other materials.

It is requisite that the inner container 6 be supported within the assembled outer casing members 1 and 3 when assembled, spaced therefrom with a minimum of points of contact, to thus as completely as possible insulate the container from the casing from passage of heat units therebetween, the dead air space thus effectively insulating the container, for a relatively long period of time to preserve its contents from deterioration, whether from transmission of heat inwardly or outwardly as the case may be.

Bricks of ice cream may thus be preserved from melting, or heated contents may be kept warm, as desired. Meat packers may utilize these for meat shipments, and merchants also may keep their goods a long time in merchantable condition.

The outer casing members 1 and 3 are of like shape, rectangular and telescoping, and when so telescoped after the inclusion of the container 6 may be secured together and sealed against the admission of air by means of a paper sealing strip 5.

Within each member 1 and 3 spacers 4 are inserted in the top member corners, with like spacers in the inner lower corners of the other member 1. These spacers may be of different shapes or sizes, or vary in arrangement, but may also be constructed of wood or fiber plates secured in and across the inner corners of the members inclinedly, such as the triangular elements 2 and 4. These are arranged oppositely, so that when the inner container 6 is inserted and the member 3 telescoped over the member 1, the corners 10 of the container only engage the sloping inner faces of the spacers at points of a minimum area of contact, the container thus being insulated by a dead air interspace all around its outer surface. The container is self seating because of the regularity of arrangement of the spacers, and the structure is very well reinforced by the spacers against shocks. The container is held against displacement by the pressure of the cover member 3 which stresses the corner points 10 against the spacers 2 and 4, slipping being thus avoided.

The modification shown in Fig. 4 substitutes in place of telescoping top closure a closure 3 which is hinged at one side at 5 to the body member 1. The joint may be sealed by extension of the hinging tape 5 all around when the closure is down.

Instead of sloping or oblique corner closures 4 as in Fig. 1, a pair of inclined plates 11 are secured across opposite upper inner angles of said closure. The abutting upper angles of the inner container 6 will then contact with these plates 11 along lines instead of points or corners as in Fig. 1. The advantage accruing from the line contacts is to render more certain the spacing of the inner container all around from the outer walls of the casing member 1, keeping it centered without danger of displacements therein due to careless placing or rough handling. Instead of placing such plates 11 in the cover 3, they may be mounted in the lower end of the casing 1, or may be used in both ends thereof, if desired.

Having described my invention, what I claim as new, and desire to secure by Letters Patent, is:

1. An insulated shipping case, comprising in combination, rectangularly cupped telescoping members having inner sloping corner truncating spacers, and an inner rectangular container removably engaged at each end corner only with said spacers to provide an open interspace about the container except at single corner points only of contact with the spacers.

2. An insulated shipping case, comprising in combination, rectangularly cupped telescoping members having inner spacer plates crossing their corners slopingly to truncate them, and an inner rectangular container having end corners, the container when positioned within the telescoped member having its corner points only engaged with and between the said truncating corner spacers in both members, providing an open interspace around the container interrupted only at single points of contact.

3. An insulated shipping and storing case, comprising in combination, rectangular inner and outer case members spaced in parallel apart, the outer parts of said members having inwardly extending oblique and truncating angle props, and the inner member corners supported removably at single points only on the props to provide an uninterrupted interspace about the inner member except at said points of contact with the props.

In testimony whereof I affix my signature.

MELVIN L. WEBSTER.